United States Patent [19]

Weaver et al.

[11] Patent Number: 4,579,939
[45] Date of Patent: Apr. 1, 1986

[54] AZO DYES FROM SUBSTITUTED 2-AMINOTHIOPHENES AND ACYCLIC ACTIVE METHYLENE COUPLERS

[75] Inventors: Max A. Weaver; Clarence A. Coates, Jr., both of Kingsport, Tenn.

[73] Assignee: Eastman Kodak Company, Rochester, N.Y.

[21] Appl. No.: 590,088

[22] Filed: Mar. 16, 1984

[51] Int. Cl.$^4$ .................... C09B 29/033; C09B 29/33; C09B 67/20; D06P 3/54
[52] U.S. Cl. .................... 534/740; 534/560; 534/583; 534/591; 162/162
[58] Field of Search .................... 260/152, 146 R; 534/740, 753, 769

[56] References Cited

U.S. PATENT DOCUMENTS

| | | | |
|---|---|---|---|
| 2,857,373 | 10/1958 | Straley et al. | 260/158 X |
| 3,245,980 | 4/1966 | Stright | 260/158 |
| 3,254,072 | 5/1966 | Stright | 260/155 |
| 3,274,171 | 9/1966 | Anderson et al. | 260/158 |
| 3,639,385 | 2/1972 | Weaver et al. | 260/152 X |
| 4,255,326 | 3/1981 | Giles et al. | 260/152 |

FOREIGN PATENT DOCUMENTS 2441524 3/1975 Fed. Rep. of Germany ...... 260/152

*Primary Examiner*—Floyd D. Higel
*Attorney, Agent, or Firm*—Donald W. Spurrell; J. Frederick Thomsen

[57] ABSTRACT

Yellow dyes from substituted 2-aminothiophene and acyclic active methylene coupling components are of particular interest for dyeing polyester fibers. The dyes have the formula:

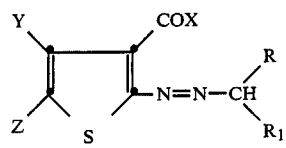

wherein: X is a group such as alkyl, allyloxy, alkoxy, aryl or the like; Y is hydrogen, alkyl, or aryl; Z is alkyl, aryl, alkylsulfonyl, cyano or COX where X is defined above; R is cyano, carbamyl, alkanoyl, aroyl, or the like; $R_1$ is selected from the R groups and

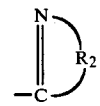

wherein $R_2$ represents the atoms necessary to complete an azole radial selected from benzothiazole, benzimidazole, benzoxazole, 1,3,4-oxadiazole, 1,3,4-thiadiazole, and pyrazole; and wherein the hydrocarbon moieties of each of the above radicals or groups may be substituted with up to three of —OH, alkoxy, hydroxyalkoxy, alkylcarbamyl, or the like.

5 Claims, No Drawings

AZO DYES FROM SUBSTITUTED 2-AMINOTHIOPHENES AND ACYCLIC ACTIVE METHYLENE COUPLERS

This invention relates to yellow dyes derived from substituted 2-aminothiophene and acrylic active methylene coupling components. They are of particulr interest as colorants for polyester fibers by dyeing and printing methods.

The present dyes have the general formula

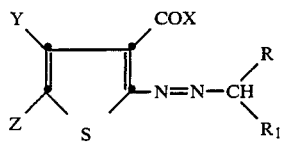

wherein: X is alkyl, allyloxy, alkoxy, aryl, aryloxy, amino, alkylamino, arylamino, cyclohexoxy, cycloalkylamino, N,N-dialkylamino, or N-alkyl-N-arylamino; Y is hydrogen, alkyl, or aryl; Z is alkyl, aryl, alkylsulfonyl, cyano or COX where X is defined above; R is cyano, carbamyl, alkanoyl, aroyl, alkoxycarbonyl, alkylcarbamyl, arylcarbamyl, cycloalkylcarbamyl, dialkylcarbamyl, benzimidazolylcarbamyl, naphthylcarbamyl, pyridylcarbamyl, or benzothiazolylcarbamyl; $R_1$ is selected from the above R groups and

wherein $R_2$ represents the atoms necessary to complete an azole radial selected from benzothiazole, benzimidazole, benzoxazole, 1,3,4-oxadiazole, 1,3,4-thiadiazole, and pyrazole; wherein the hydrocarbon moieties of each of the above radicals or groups may be substituted with up to three of —OH, alkoxy, hydroxyalkoxy, alkanoyloxy, alkylcarbamyl, dialkylcarbamyl, arylcarbamyl, —NO$_2$, hydroxyalkyl, alkanoylamino, alkanoyl, alkoxycarbonyl, —CF$_3$, aryloxy, halogen, alkoxyalkoxy, aryl, —CN, alkenyl, phthalimido, succinimido, furyl, cyclohexyl, or cycloalkyl substituted with hydroxyalkyl; and wherein the alkyl groups or moieties within the above definitions of X, Y, Z, R and $R_1$ contain from 1–12, preferably 1–8, and most preferably 1–6 carbons and are straight or branched chain.

The dyes of this invention impart bright greenishyellow shades to polyesters by dyeing and printing methods and are particularly valuable for mixing with blue colorants to produce bright green colors. The new dyes may also serve as water-insoluble pigments and are suitable for coloring lacquers, natural or synthetic resins, and for printing textile fibrous materials or paper. Several of the dyes show outstanding stability to high pH conditions. The colorants containing higher alkyl groups have good solubility in organic solvents and are suitable, for example, for coloring hydrocarbons, such as fuel oil. The dyes, in general, exhibit improved properties such as fastness to light, sublimation, chlorine, heat, ozone, oxides of nitrogen, gas, perspiration, crock, and wash, and exhibit good build, pH stability, bloom resistance, dye bath exhaustion, depth of shade, leveling, strike rate, migration, and the like over dyes such as are disclosed in Br. Pat. No. 1,394,365.

In general, the present dyes are prepared by diazotizing substituted 2-aminothiophenes II

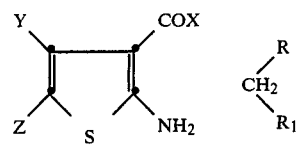

and coupling with active methylenes III under basic conditions. Reactants II are prepared as disclosed for example in [Z. Chem., Volume 2, page 305 (1962); Chem. Ber., Volume 98, page 3571 (1965), and Volume 99, page 2712 (1966), and Chem. Heterocyclic Compounds, Volume 2, page 285 (1966); and Volume 3, page 178 (1967)]. Dyes where the COX group is an aniline substituent are best prepared by treating the corresponding carbomethoxy derivative with an aliphatic amine or ammonia to effect an ester-amide interchange reaction such as

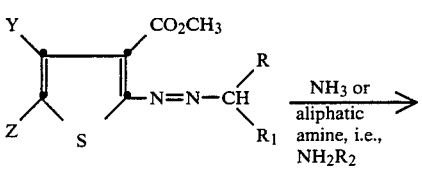

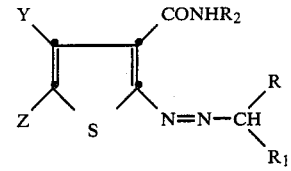

Typical useful coupling components include the following: 2,4-pentanedione (acetylacetone); 1-phenyl-1,3-butanedione (benzoylacetone); 1,3-diphenyl-1,3-propanedione (dibenzoylmethane); acetoacetanilide; acetoacet-o-anisidide; acetoacet-m-xylidide; acetoacet-o-chloroanilide; α-cyanoacetanilide; malononitrile; ethyl cyanoacetate; α-benzoylacetanilide; methylpivaloylacetate; 2-cyanomethylbenzimidazole; and 2-cyanomethylbenzoxazole.

The following examples will illustrate the invention:

EXAMPLES 1–10

Diazotization and Coupling

Sodium nitrite (7.2 g) was added portionwise to concd. H$_2$SO$_4$ (50 ml) with stirring, allowing the temperature to rise. The solution was cooled and 100 ml of 2:5 acid (2 parts propionic acid:5 parts acetic acid—by volume) was added at less than 20° C., followed by cooling to about 0° C. 2-Amino-3,5-dicarbethoxy-4-methylthiophene, 25.7 g., 0.10 m (gm. mole) was added at 0°–5° C. and then another 100 ml of 2:5 acid was added at <5° C. and stirring continued for 1.5 hr.

Each of the following couplers 1–10 (0.01 m of each):
Example 1-2,4-Pentanedione;
Example 2-1,3-Diphenyl-1,3-propanedione;
Example 3-Malononitrile;
Example 4-Acetoacetanilide;
Example 5-Acetoacet-o-anisidide;
Example 6-Acetoacet-o-chloroanilide;

Example 7-Acetoacet-m-xylidide;
Example 8-Acetoacet-p-phenetidide;
Example 9-α-Benzoylacetanilide; and
Example 10-Methyl pivaloylacetate;
was dissolved in approximately 400 ml of ice-water mixture to which 12 ml of 50% NaOH solution had been added. A 0.01 m aliquot of the above diazonium salt solution was added rapidly to each coupler solution. If the coupling mixture became thick, additional ice-water mixture was added. After allowing to couple for about 15 minutes, the yellow dyes were collected by filtration, washed with water, and dried in air. The dyes produced bright yellow shades on polyester fibers and had moderate to excellent lightfastness and good pH stability.

EXAMPLE 11

A 0.01 m portion of 2-amino-3,5-dicarbomethoxy-4-methylthiophene, was diazotized and coupled with 0.01 m of acetoacetanilide as described above to yield 4.0 g. of the dye

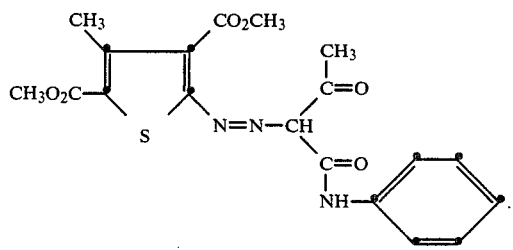

EXAMPLE 12

The dye from Example 11 (0.01 m), 2-aminoethanol (15 ml), and N,N-dimethyl formamide (15 ml) were stirred and heated together at 30°–35° C. for 15 min. The reaction mixture was drowned into 300 ml of ice-water mixture and treated with 15 ml of concd. HCl. The yellow dye was collected by filtration, washed with water, and dried in air. Ester-amide interchange occurred mostly at the 3-carbomethoxy group to give the dye.

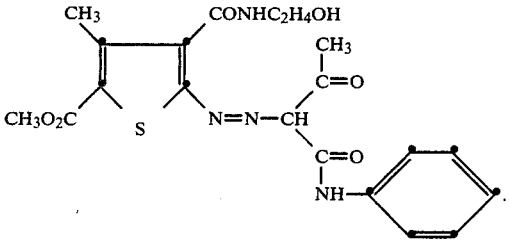

Prolonged heating at higher temperature gave additional reaction at the 5-carbomethoxy group to give the bis-amide dye.

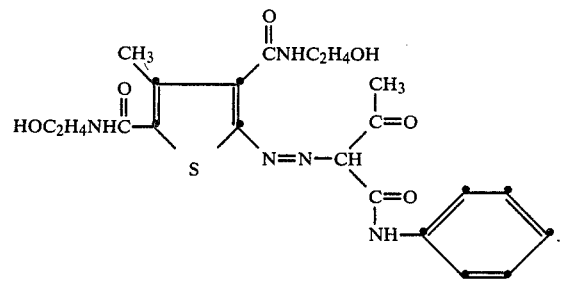

The following examples in Table I further illustrate the invention. The preferred dyes are those where: X is alkoxy or alkylamino; Y is H or alkyl; Z is carboalkoxy, acyl, cyano, or aryl; R is alkanoyl or aroyl; and $R_1$ is alkanoyl or arylcarbamyl.

TABLE I $$\begin{array}{c} \text{Y} \quad \text{COX} \\ \diagdown \diagup \\ \text{structure with S ring, N=N-CH(R)(R_1)} \\ \diagup \diagdown \\ \text{Z} \end{array}$$

| Ex. No. | X | Y | Z | R | R₁ |
|---|---|---|---|---|---|
| 13 | $OC_2H_5$ | $CH_3$ | $CO_2C_2H_5$ | $CONH$—C₆H₄—$C_2H_4OH$ | $COCH_3$ |
| 14 | $OC_2H_5$ | $CH_3$ | $CO_2C_2H_5$ | $CONH$—C₆H₄—$OC_2H_4OH$ | $COCH_3$ |
| 15 | $OCH_2CH=CH_2$ | $CH_3$ | $C_2H_5$ | $CONH$—(thiophene) | $COOCH_2NHCH_2$ |
| 16 | $NHC_2H_5$ | $CH_3$ | $CO_2C_2H_5$ | $CONHC_4H_9$—n | $COCH_3$ |
| 17 | $OC_2H_5$ | H | $CO_2C_2H_5$ | $CON(C_2H_5)_2$ | $COCH_2Cl$ |
| 18 | Ph | $CH_3$ | $COCH_2OOCCH_3$ | $CONH$—benzimidazolone (NH—C=O—NH) | $CONHCH_3$ |
| 19 | $OC_2H_5$ | $CH_3$ | $CO_2C_2H_5$ | $CONH$—naphthyl | $COCH_3$ |

TABLE I-continued $$\begin{array}{c} Y\diagdown\phantom{xx}\diagup COX \\ \phantom{xx}\diagdown\diagup \\ \phantom{xxx}S \\ Z\diagup\phantom{xx}\diagdown N{=}N{-}\underset{\underset{R_1}{|}}{\overset{\overset{R}{|}}{C}}H \end{array}$$

| Ex. No. | X | Y | Z | R | $R_1$ |
|---|---|---|---|---|---|
| 20 | $OC_2H_5$ | H | $CO_2Ph$ | CONH—(pyridyl) | CONHPh |
| 21 | NHPh | $CH_3$ | $CO_2C_2H_5$ | CONH—(benzothiazolyl) | CONHPh |
| 22 | $OC_2H_5$ | $CH_3$ | Ph | CONH—C₆H₄—NHCOCH₃ | CONHPh |
| 23 | $OC_6H_{11}$ | Ph | $CO_2C_2H_5$ | CONH—C₆H₄—COCH₃ | $COCH_3$ |
| 24 | $NHCH_3$ | $CH_3$ | $COCH_3$ | CONH—C₆H₄—$CO_2C_2H_5$ | CONHPh |
| 25 | $OC_2H_5$ | $CH_3$ | $CO_2C_2H_5$ | CONH—C₆H₄—$CF_3$ | $COCH_3$ |

TABLE I-continued

[Structure: thiophene ring with substituents Y, COX, Z, and N=N—CH(R)(R₁)]

X group shown: [thiophene ring with two methyl-like substituents]

| Ex. No. | X | Y | Z | R | R₁ |
|---|---|---|---|---|---|
| 26 | [thiophene] | CH₃ | CO₂C₂H₅ | CONH—[phenyl-O-phenyl] | COCH₂OC₂H₅ |
| 27 | OC₂H₅ | CH₃ | COC₂H₅ | COCH₃ | [benzimidazole: N=/N-H ring fused to benzene] |
| 28 | NHC₆H₁₁ | Ph | CO₂C₂H₅ | COC₂H₅ | [benzoxazole: N=C-O ring fused to benzene] |
| 29 | OC₂H₅ | H | SO₂CH₃ | OPh—p-Cl | [benzothiazole: N=C-S ring fused to benzene] |
| 30 | OC₂H₅ | H | Ph | CN | [oxadiazole: N=C(CH₃)-O-N=C-] |

TABLE I-continued
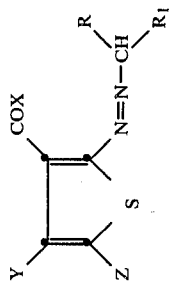
| Ex. No. | X | Y | Z | R | R₁ |
|---|---|---|---|---|---|
| 31 | $OC_2H_5$ | $C_2H_4OH$ | COPh | CN | ![triazole-like ring with CH₃ and S] |
| 32 | $OC_2H_5$ | Ph-p-OH | $COCH_2Ph$ | CN | ![imidazole-like ring with CH₃ and NH] |
| 33 | $OC_2H_5$ | $CH_2CH_2OCH_3$ | $CO_2C_2H_5$ | $CONHC_6H_5$ | $CONH_2$ |
| 34 | $OC_2H_5$ | $CH_2CH_2OC_2H_5$ | $CO_2C_2H_5$ | $CONHC_6H_4$—p-Br | $COC(CH_3)_2$ |
| 35 | $OC_2H_5$ | $CH_3$ | CN | CONH—⌬—CON($C_2H_5)_2$ | $COCH_2C_6H_{11}$ |
| 36 | $OC_2H_5$ | $CH_2CH_2OC_2H_2OC_2H_5$ | $CO_2$ | CONH—⌬—⌬—$CF_3$ | $COCH_2Ph$ |
| 37 | $OC_2H_5$ | $CH_3$ | $CO_2C_2H_5$ | CONH—⌬(Cl,Cl,Cl) | $COCH_2CH_2OH$ |

TABLE I-continued

[Structure shown at top of table with substituents X, Y, Z on thiophene ring with COX group and N=N—CH(R)(R₁) hydrazone group]

| Ex. No. | X | Y | Z | R | R₁ |
|---|---|---|---|---|---|
| 38 | $OC_2H_5$ | $CH_3$ | CN | [3-nitrophenyl-CONH] | $COCH_3$ |
| 39 | $OCH_3$ | $CH_2OCH_2CH_2OH$ | $CO_2C_4H_9-n$ | $COCH_2CH_2OH$ | $COCH_3$ |
| 40 | $NHC_2H_4OH$ | $CH_3$ | $CO_2C_4H_9-n$ | $COCH_2OC_2H_5$ | $COCH_3$ |
| 41 | $OCH_3$ | $CH_3$ | $CO_2C_2H_4OC_2H_5$ | $COCH_2OCH_2CH_2OH$ | $COC_6H_5$ |
| 42 | $OCH_3$ | Ph—p—NHCOCH₃ | $CO_2C_2H_4OC_2H_4OC_2H_5$ | $COC_6H_4-p-OOCCH_3$ | $COC_6H_4-p-Cl$ |
| 43 | $OCH_3$ | $CH_3$ | $CO_2C_6H_5$ | $COCH_3$ | $COCH_3$ |
| 44 | $OCH_3$ | $CH_2NHCOCH_3$ | $CO_2CH_2C_6H_5$ | [4-hydroxyphenyl-CONH] | $COCH_2CH_2CN$ |
| 45 | $OCH_3$ | Ph—p—Cl | $CO_2CH_2CH_2OC_6H_5$ | [4-methoxyphenyl-CONH] | $COCH_3$ |
| 46 | $OCH_3$ | $CH_2Cl$ | $CO_2CH_2CH_2OH$ | [3,5-dimethoxyphenyl-CONH] | $COCH_2OOCH_3$ |
| 47 | $OCH_3$ | $CH_3$ | $CO_2CH_2CH_2CN$ | [4-(2-hydroxyethyl)phenyl-CONH] | $COCH_3$ |

TABLE I-continued structure: Y, COX on cyclopentadiene-like ring with S, Z, and =N-N=CH(R)(R1) substituent

| Ex. No. | X | Y | Z | R | R1 |
|---|---|---|---|---|---|
| 48 | OCH3 | CH2Br | CO2CH2CH2Cl | 4-(OC2H4OH)-C6H4-CONH- | COCH3 |
| 49 | OCH3 | CH2CH2CF3 | C6H5 | 5-(CONH-)thiophen-2-yl | COOCH2NHCH3 |
| 50 | NH2 | CH2Ph | C6H5 | CONHC4H9-n | COCH3 |
| 51 | NHC3H6OCH3 | H | C6H4—p-OCH3 | CON(C2H5)2 | COCH2Cl |
| 52 | NHC2H4OH | CH2C6H11 | C6H4—p-CH3 | 2-(CONH-)-1-(NH-C(=O)-NH-) benzene | CONHCH3 |
| 53 | OCH3 | CH2CH2CN | C2H5 | naphthalen-1-yl-CONH- | COCH3 |
| 54 | NHC2H4OH | H | C2H5 | pyridin-2-yl-CONH- | CONHPh |

TABLE I-continued
| Ex. No. | X | Y | Z | R | R₁ |
|---|---|---|---|---|---|
| 55 | OC₂H₅ | H | (CH₃)₂CHC(=O)— | 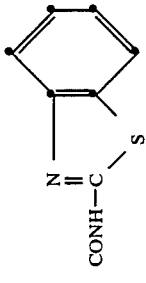 | CONHPh |
| 56 | OCH₃ | CH₂COOCH₃ |  |  | CONHPh |
| 57 | OCH₃ | CH₃ | COCH₃ |  | COCH₃ |
| 58 | OCH₃ | C₆H₅ | CO₂C₂H₅ |  | CONHPh |
| 59 | OCH₃ | CH₃ | CN |  | COCH₃ |
| 60 | NHC₂H₄OH | CH₃ | CN |  | COCH₂OC₂H₅ |

TABLE I-continued
[Structure shown at top: Y, COX, R, Z, S, N=N—CH, R₁]
| Ex. No. | X | Y | Z | R | R₁ |
|---|---|---|---|---|---|
| 61 | OCH₃ | CH₃ | 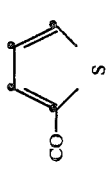 | COCH₃ | 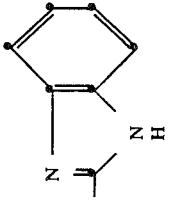 |
| 62 | OC(CH₃)₃ | CH₃ | COC₂H₅ | COC₂H₅ | 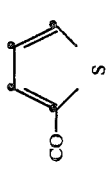 |
| 63 | C₆H₅ | CH₃ | COC₂H₅ | OPh—p-Cl | 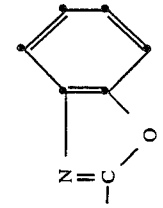 |
| 64 | N(C₂H₅)₂ | CH₃ | COC₂H₅ | CN | 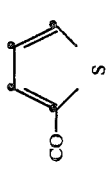 |
| 65 | N(CH₃)C₆H₅ | CH₃ | COC₂H₅ | CN | 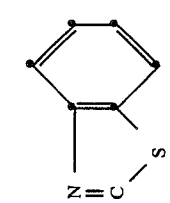 |

TABLE I-continued

Structure:

$$\begin{array}{c}\text{COX}\\ \text{Y}\diagdown\diagup\text{R}\\ \text{Z}\diagup\text{S}\diagdown\text{N}=\text{N}-\text{CH}\diagup\text{R}\\ \phantom{XXXXXXXX}\diagdown\text{R}_1\end{array}$$

| Ex. No. | X | Y | Z | R | $R_1$ |
|---|---|---|---|---|---|
| 66 | $OC_4H_9-n$ | $CH_3$ | ![phenyl-CONH-] (p-CONH-C₆H₄-) CONH | CN | triazole ring (HC=C(CH₃)—N=C(CH₃)—NH) |
| 67 | $OCH(CH_3)_2$ | $CH_3$ | p-OCH₃-C₆H₄-CONH | $CONHC_6H_5$ | $CONH_2$ |
| 68 | $OCH_3$ | $CH_3$ | $CO_2C_6H_{13}-n$ | $CONHC_6H_4-p\text{-}Br$ | $COC(CH_3)_2$ |
| 69 | $OC_4H_9-n$ | $CH_3$ | $CO_2C_8H_{17}-n$ | p-CON(C₂H₅)₂-C₆H₄-CONH | $COCH_2C_6H_{11}$ |
| 70 | $OC_6H_{13}-n$ | $Ph-p\text{-}OCH_3$ | $CO_2CH_2CH_2CH(CH_3)_2$ | p-CF₃-C₆H₄-CONH | $COCH_2Ph$ |
| 71 | $OC_2H_5$ | $CH_3$ | $CO_2CH_2CH(C_2H_5)C_4H_9-n$ | 2,5-Cl₂-C₆H₃-CONH | $COCH_2CH_2OH$ |

TABLE I-continued

![structure with Y, COX, R, N=N-CH, R1, S, Z]

| Ex. No. | X | Y | Z | R | R1 |
|---|---|---|---|---|---|
| 72 | OCH₂CH(C₂H₅)C₄H₉—n | CH₃ | CO₂CH₂CH(C₂H₅)C₄H₉—n | 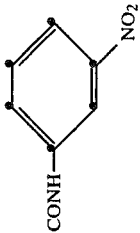 CONH—⌬—NO₂ | COCH₃ |
| 73 | OCH(CH₃)C₂H₅ | CH₃ | CO₂CH₂CH(CH₃)C₃H₇—n | COCH₂CH₂OH | COCH₃ |
| 74 | OC₁₀H₂₁—n | Ph—p-CN | CO₂C₁₀H₂₁—n | COCH₂OC₂H₅ | COCH₃ |
| 75 | NHCH₂CH(C₂H₅)C₄H₉—n | CH₃ | CO₂CH₂CH=CH₂ | COCH₂OCH₂CH₂OH | COC₆H₅ |
| 76 | OCH₂CH₂OC₄H₉—n | CH₃ | CO₂CH₂CH₂OC₄H₉—n | COC₆H₄—p-OOCCH₃ | COC₆H₄—p-Cl |
| 77 | OC₂H₅ | CH₃ | [thiophene-CO₂-] | COCH₃ | COCH₃ |
| 78 | OCH₃ | CH₃ | CO₂C₁₂H₂₅—n |  CONH—⌬—OH | COCH₂CH₂CN |
| 79 | OC₂H₅ | CH₃ | CO₂CH₂CH=CH₂ | 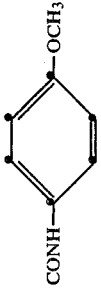 CONH—⌬—OCH₃ | COCH₃ |
| 80 | [thiopyran-O] | CH₃ | CO₂C₂H₅ | 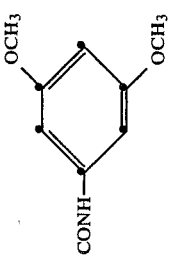 CONH—⌬(OCH₃)₂ | COCH₂OOCH₃ |

TABLE I-continued

Structure:
- Y—C(COX)=C(—N=N—CH(R)(R₁))—S—C(Z)=... (thiophene-like with substituents X, Y, Z, R, R₁)

| Ex. No. | X | Y | Z | R | R₁ |
|---|---|---|---|---|---|
| 81 | OCH₃ | CH₃ | CO₂C₂H₄N(COCH₂)(COCH₂) | 4-(C₂H₄OH)-C₆H₄-CONH– | COCH₃ |
| 82 | OCH₃ | CH₃ | CO₂CH₂-(2-furyl, O) | 4-(OC₂H₄OH)-C₆H₄-CONH– | COCH₃ |
| 83 | OCH₃ | CH₃ | CO₂CH₂CH₂NHCOCH₃ | 2-thienyl-CONH– | COOCH₂NHCH₃ |
| 84 | OCH₃ | CH₃ | CO₂CH₂-(thiophene) | CONHC₄H₉—n | COCH₃ |
| 85 | OCH₃ | CH₃ | CO₂CH₂-(thiophene-CH₂OH) | CON(C₂H₅)₂ | COCH₂Cl |
| 86 | OCH₃ | CH₃ | CO₂CH₂CH₂Br | C₆H₄(CONH–)(NH—C(=O)—NH–) | CONHCH₃ |

TABLE I-continued $$\underset{Z}{\overset{Y}{\diagdown}}\underset{S}{\overset{COX}{\diagup}}\underset{}{\overset{}{\diagdown}}N=N-\underset{R}{\overset{R}{C}}H-R_1$$

| Ex. No. | X | Y | Z | R | R₁ |
|---|---|---|---|---|---|
| 87 | OCH₃ | H | SO₂CH₃ | naphthyl-CONH- | COCH₃ |
| 88 | OCH₃ | H | SO₂CH₃ | pyridyl-CONH- | CONHPh |
| 89 | NHC₂H₄OC₂H₄OH | CH₃ | CO₂C₂H₅ | CONH-C(=N-)S (benzothiazolyl) | CONHPh |
| 90 | OCH₃ | CH₃ | CONH₂ | 4-NHCOCH₃-C₆H₄-CONH- | CONHPh |

The invention has been described in detail with particular reference to preferred embodiment thereof but it will be understood that variations and modifications can be effected within the spirit and scope of the invention.

I claim:

1. A dye of the formula

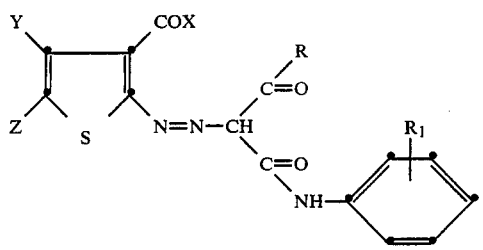

wherein: X is alkoxy; Y is H or alkyl; Z is alkanoyl, or alkanoyl substituted with succinimido; $R_3$ is alkyl or phenyl; and $R_4$ is H, alkyl, alkoxy or Cl.

2. A dye according to claim 1 wherein: Y is H or $CH_3$; Z is $CH_3OOC-$, $C_2H_5-OOC-$, $(CH_3)_2CHCO-$ or succinimidoethoxycarbonyl; X is methoxy or ethoxy; R is $CH_3$ or phenyl; and $R_1$ is H, $OCH_3$, Cl or $CH_3$.

3. The dye according to claim 1 of the formula

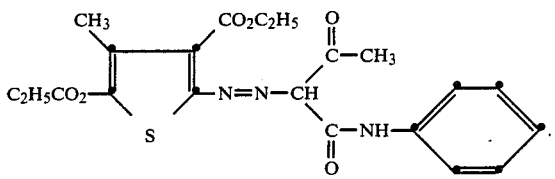

4. The dye according to claim 1 of the formula

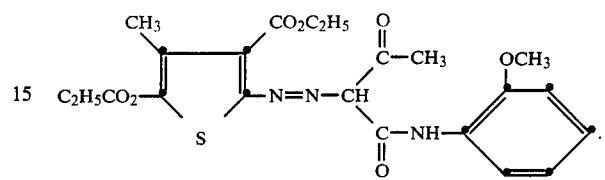

5. The dye according to claim 1 of the formula

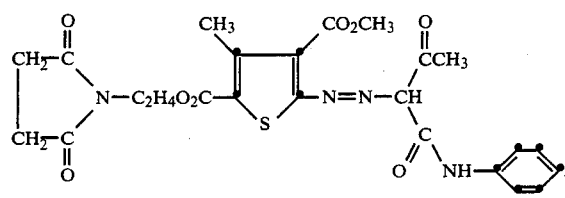

* * * * *